(12) United States Patent
Van De Wege et al.

(10) Patent No.: US 11,950,528 B2
(45) Date of Patent: Apr. 9, 2024

(54) COMMON DRIVE MEMBER FOR WEED SEED MILL OF COMBINE HARVESTER

(71) Applicant: CNH Industrial America LLC, New Holland, PA (US)

(72) Inventors: Charlotte Van De Wege, Zulte (BE); Frank R. G. Duquesne, Zwevegem (BE); Ruben Vancoillie, Rumbeke (BE); Nathan E. Isaac, Lancaster, PA (US); Pieter Vandevelde, Sint Michiels Brugge (BE)

(73) Assignee: CNH Industrial America LLC, New Holland, PA (US)

( * ) Notice: Subject to any disclaimer, the term of this patent is extended or adjusted under 35 U.S.C. 154(b) by 383 days.

(21) Appl. No.: 17/483,169

(22) Filed: Sep. 23, 2021

(65) Prior Publication Data

US 2023/0086794 A1 Mar. 23, 2023

(51) Int. Cl.
*A01D 41/12* (2006.01)
*A01D 69/06* (2006.01)
*A01F 12/40* (2006.01)
*A01F 12/56* (2006.01)
*A01F 12/18* (2006.01)

(52) U.S. Cl.
CPC ......... *A01D 41/1243* (2013.01); *A01D 69/06* (2013.01); *A01F 12/40* (2013.01); *A01F 12/56* (2013.01); *A01F 12/184* (2013.01)

(58) Field of Classification Search
None
See application file for complete search history.

(56) References Cited

U.S. PATENT DOCUMENTS

| | | | |
|---|---|---|---|
| 9,795,081 | B2 | 10/2017 | Middelberg et al. |
| 9,848,537 | B2 | 12/2017 | Bojsen |
| 10,004,176 | B2 | 6/2018 | Mayerle |
| 10,314,232 | B2 | 6/2019 | Isaac et al. |
| 10,375,884 | B2 | 8/2019 | Claerhout et al. |
| 11,019,768 | B2 | 6/2021 | Rittershofer et al. |
| 2014/0298766 | A1 | 10/2014 | Furmaniak |

(Continued)

FOREIGN PATENT DOCUMENTS

| | | |
|---|---|---|
| AU | 2021101123 A4 | 5/2021 |
| CN | 107318351 A | 11/2017 |

(Continued)

OTHER PUBLICATIONS

International Search Report and Written Opinion for Application No. PCT/US2022/044506 dated Jan. 4, 2023 (11 pages).

*Primary Examiner* — Alicia Torres
*Assistant Examiner* — Ashley A Kaercher
(74) *Attorney, Agent, or Firm* — Peter K. Zacharias

(57) ABSTRACT

An agricultural harvester includes a straw hood having a hollow interior space for receiving material other than grain (MOG) from a threshing and separating system of the harvester and chaff from a cleaning system of the harvester. A drive system is provided for powering a straw chopper and a weed seed mill. The drive system includes a single belt positioned outside of the straw hood that is wound at least partially around (i) a straw chopper pulley that powers the straw chopper, (ii) a weed seed mill pulley that powers the weed seed mill, and (iii) a power take off shaft of the harvester that receives power from an engine or other power source of the harvester.

15 Claims, 5 Drawing Sheets

(56) References Cited

U.S. PATENT DOCUMENTS

| | | | |
|---|---|---|---|
| 2016/0113202 A1* | 4/2016 | Mayerle | A01F 12/40 460/112 |
| 2018/0070534 A1* | 3/2018 | Mayerle | A01F 12/40 |
| 2019/0124849 A1 | 5/2019 | Farley et al. | |
| 2020/0077592 A1 | 3/2020 | Mayerle | |
| 2020/0128733 A1 | 4/2020 | Vandike et al. | |
| 2020/0236850 A1* | 7/2020 | Mayerle | A01D 41/14 |

FOREIGN PATENT DOCUMENTS

| | | |
|---|---|---|
| EP | 3172959 B1 | 9/2018 |
| EP | 3228175 B1 | 12/2018 |
| FR | 2282784 A1 | 3/1976 |

* cited by examiner

COMMON DRIVE MEMBER FOR WEED SEED MILL OF COMBINE HARVESTER

FIELD OF THE INVENTION

The present invention relates to agricultural harvesters. More specifically, the present invention relates to a drive system for a weed seed mill for a combine harvester.

BACKGROUND OF THE INVENTION

As is described in U.S. Pat. No. 10,314,232 to CNH America LLC (the '232 patent), which is incorporated by reference in its entirety and for all purposes, an agricultural harvester known as a "combine" is historically termed such because it combines multiple harvesting functions with a single harvesting unit, such as picking, threshing, separating and cleaning. The separating system of the combine directs the non-grain material to a residue system. The residue system distributes the non-grain material through a chopper, a spreader, and/or a windrow chute before it is distributed onto the field.

Crop residue that is discharged onto fields often contains lost grain and seeds, including shrunken crop seeds and weed seeds. Most or all of the seeds are in the chaff that exits the cleaning system. Many of the seeds are not destroyed and remain viable after exiting the combine. Viable seeds can germinate and sprout in the field, resulting in the spread of undesired weeds and potential crop disease. Weeds that sprout are typically killed by tillage or chemical treatment, however, weed control measures such as these are costly. Moreover, these weed control measures require additional equipment passing over the field, which can increase soil compaction and adversely impact the condition of the field.

The '232 patent discloses a weed seed mill positioned for destroying the weed seeds through shearing forces. A weed seed mill may also be referred to herein or in the art as a seed processor, chaff mill, chaff mill assembly, or chaff processor. The seed mill is configured to receive crop residue from a cleaning system of the combine and destroy or damage seeds through shearing forces, so that when the seeds exit the combine, the seeds are no longer viable and able to germinate. The weed seed mill may be powered by a drive system including a shaft mounted pulley that is driven by a belt that is indirectly connected to the engine of the combine (for example). Due to the rearward location of the seed processor in the combine, the shaft mounted pulley is positioned outside of the straw hood of the combine and either in or near a rear wheel well of the combine. For combines having steerable rear wheels, such positioning of the pulley presents an obstacle because the pulley or the belt that is mounted to that pulley could interfere with the steered rear wheels. While it is possible to limit the turning radius of the steerable rear wheels, such a modification may be viewed as an undesirable restriction on the maneuverability of the combine.

In view of the foregoing, it would be desirable to incorporate a drive system for a weed seed mill into the rear end of the combine without impacting performance or maneuverability of the combine.

SUMMARY OF THE INVENTION

According to one aspect of the invention, an agricultural harvester includes a straw hood having a hollow interior space for receiving material other than grain (MOG) from a threshing and separating system of the harvester and chaff from a cleaning system of the harvester. A drive system is provided for powering a straw chopper and a weed seed mill. The drive system includes a single belt positioned outside of the straw hood that is wound at least partially around (i) a straw chopper pulley that powers the straw chopper, (ii) a weed seed mill pulley that powers the weed seed mill, and (iii) a power take off shaft of the harvester that receives power from an engine or other power source of the harvester.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
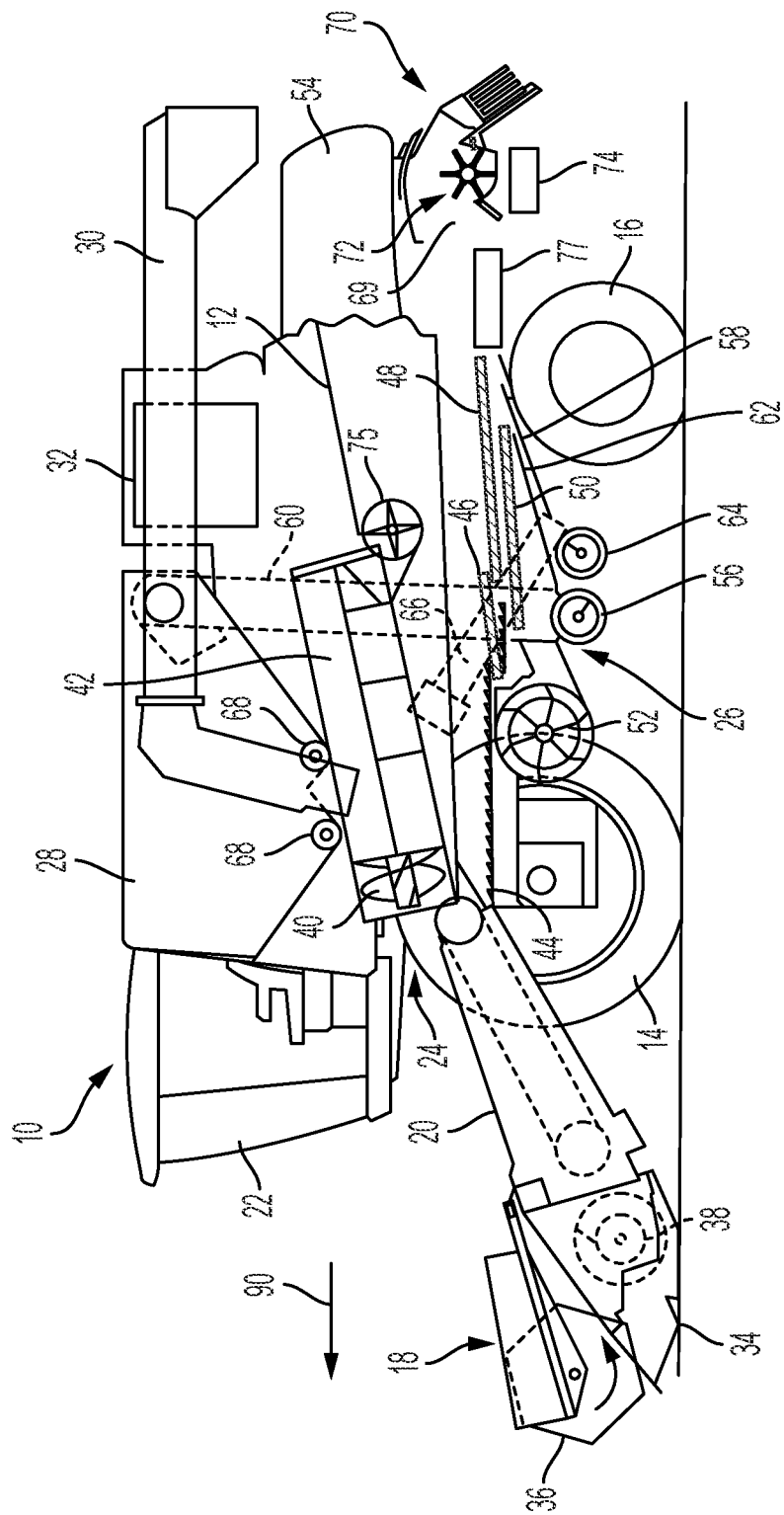
FIG. 1 is a side view of an embodiment of an agricultural harvester in the form of a combine illustrating the residue handling system of the present invention in a cutout view toward the rear of the harvester.
Figure 2:
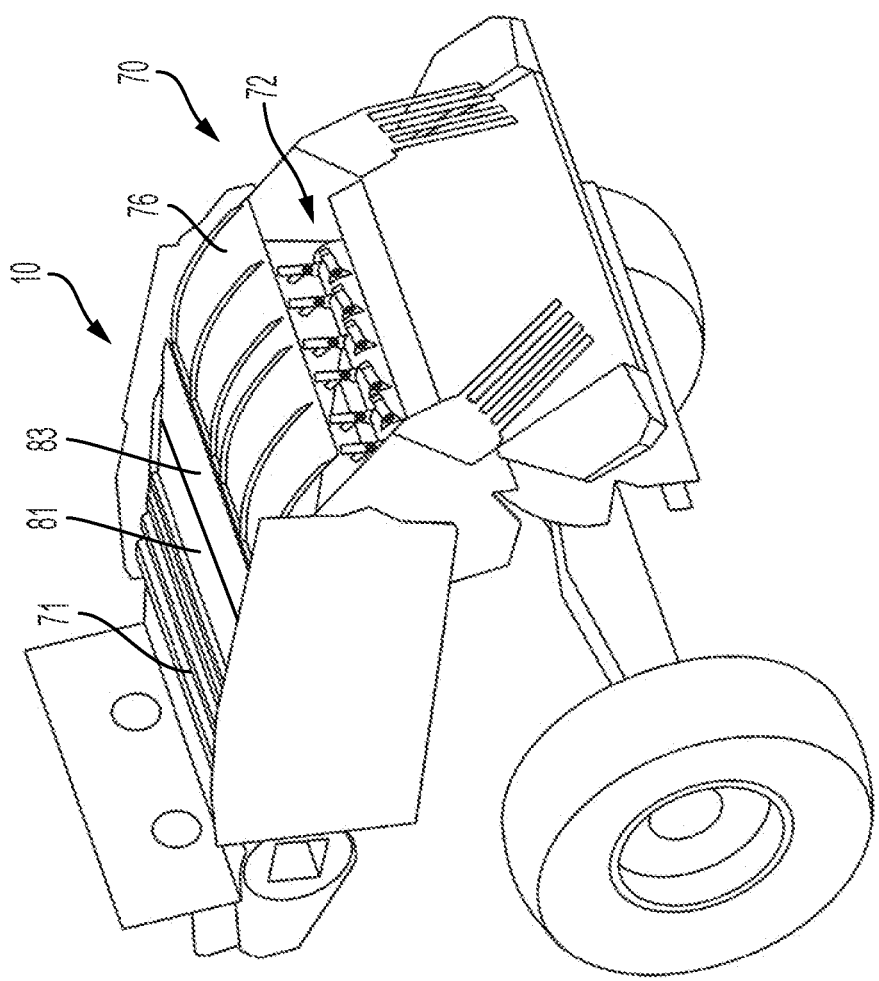
FIG. 2 is a rear perspective view of some of the components of the harvester of FIG. 1 showing further details of the present invention.

It is noted that the figures depict the elements in schematic form and are not necessarily to scale.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "grain", "chaff", "straw", and "tailings" are used principally throughout this specification for convenience but it is to be understood that these terms are not intended to be limiting. Thus "grain" refers to that part of the crop material that is threshed and separated from the discardable part of the crop material, which is referred to as chaff and includes straw, seeds, and other non-grain crop material.

Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "upstream" and "downstream" are determined with reference to the crop flow stream arrows shown in FIG. 3.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Motive force is selectively applied to the front wheels 14 through a power plant in the form of a diesel engine 32 and a transmission (not shown). Both the front and rear wheels 14 and 16 may be steerable.

The header 18 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to threshing and the separating system 24.

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52, which provides an airflow through the sieves, to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of the lower sieve 50. The clean grain auger 56 receives clean grain from each sieve 48, 50 and from bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

Although a rotary combine has been described thus far, it should be understood that the details presented herein are not limited to rotary combine and may be applicable to other machines, such as conventional combines and cross harvester combines.

A residue handling system 70 is integrated in the rear of harvester 10. Residue handling system 70 generally comprises a straw hood 54, a discharge beater 75, seed mills 77, a chopper 72, and horizontally oriented spreaders 74 that are all at least partially positioned within straw hood 54.

Referring now to the individual components of residue handling system 70, straw hood 54 includes opposing side walls 55 that are connected to a top wall 71. The walls 55 and 71 together define an interior space, which is referred to herein as a passageway 69 for straw and chaff.

A windrow mode selection door 76 is mounted to the top wall 71 of straw hood 54 at a location above the chopper 72. Door 76 pivots between two positions, namely, a deployed (i.e., extended) position and a retracted position shown in FIG. 3. In the deployed position, the first stream 80 of residue (straw), which is discharged from the discharge beater 75, is diverted over top of the chopper 72, through the windrow outlet of the machine 10 and onto a hood or chute (see FIG. 1) that guides the residue to form a windrow behind the machine 10. In the retracted position of door 76 shown in FIG. 3, the door 76 prevents the first stream 80 of residue from passing through the windrow outlet. And, the first stream 80 is directed to the residue chopper 72.

Discharge beater 75 is configured to deliver the stream 80 of straw material into the upper end of passageway 69 towards chopper 72. The cleaning system 26, which includes sieve 48, is configured to deliver a stream 78 of chaff material along the lower end of passageway 69. Stream 78 of chaff is designated by the double headed arrow shown in FIG. 3. Sieve 48 is mounted to a reciprocating cleaning shoe 49. Chopper 72 is configured to rotate and chop the straw material and deliver it to spreader 74. Chopper 72 is partially surrounded by a chopper housing 57 that comprises an interior facing wall 57a (or shroud) and an exterior facing wall 57b. The spreader 74 discharges the non-grain crop material across the harvested width behind harvester 10. Further details of discharge beater 75, chopper 72 and spreader 74 are provided in the '232 patent.

It is noted that chopper 72 may be omitted, if so desired. For example, if beater 75 has two speed settings (e.g., high and low), there may not be a need to include a separate chopper 72 because the beater 75 can act as a chopper when it is operated at the high speed setting.

Figure 3:
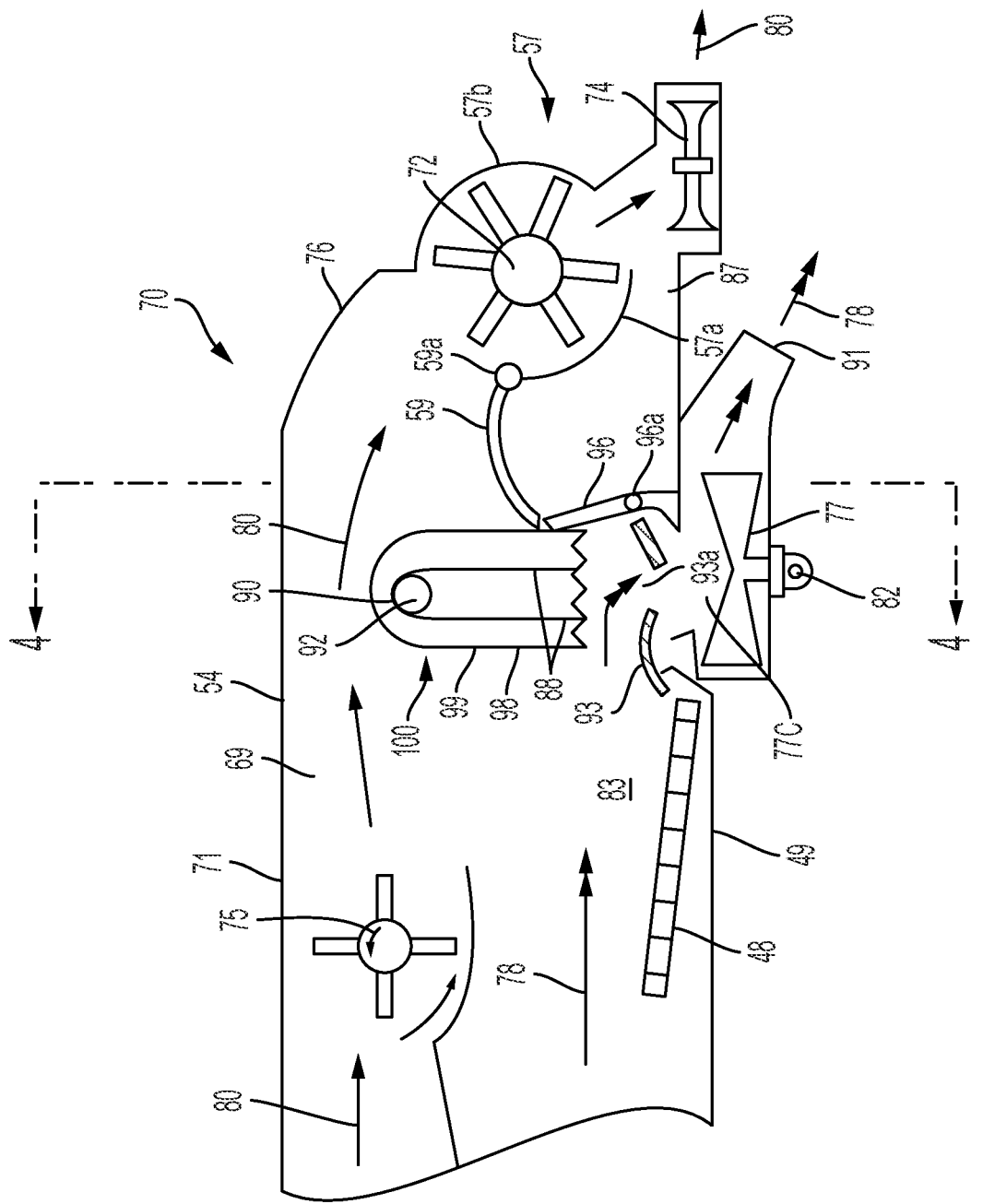
FIG. 3 is a side cutaway view of the residue handling system of FIGS. 1 and 2, whereby the residue handling system is shown schematically and various features are shown cut-away.
Figure 4:
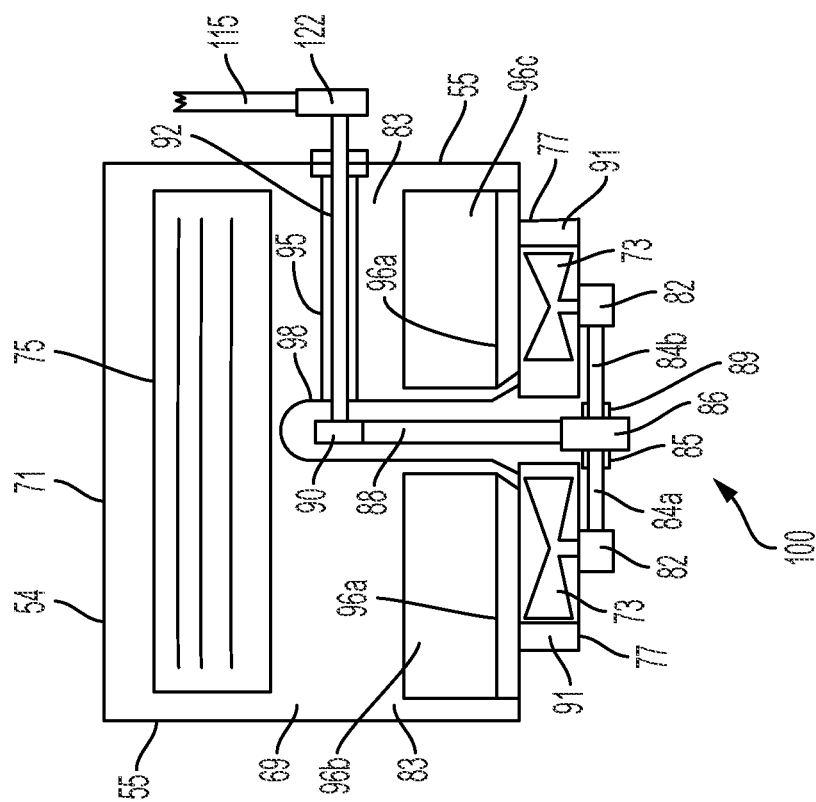
FIG. 4 is a cross-sectional view of the residue handling system of FIG. 3 taken along the lines 4-4.

Turning now to FIGS. 3 and 4, two seed mills 77 are positioned at the bottom side of straw hood 54. Each seed mill 77 receives a portion of second stream 78 of chaff from the cleaning system 26 via passageway 69. Seed mills 77 are powered by a belt 88 (or other device) that is positioned within the interior of straw hood 54. A cover 98 conceals the belt 88. It is noted that the cover 98 and belt 88 are shown partially cut-away in FIG. 3 to reveal further components of the combine. Further details in connection with seed mills 77 are described in U.S. Pat. No. 10,004,176, which is incorporated by reference in its entirety.

An oscillating pan 93 is mounted to reciprocating cleaning shoe 49 and oscillates therewith. Pan 93 includes a central opening 93a that is disposed above the inlet 77c of mill 77 for directing the chaff stream 78 into mill 77.

A seal 96, which may be composed of rubber or metal, for example, is pivotably mounted to the top surface of mill 77 (or another fixed point on the combine) at a location adjacent inlet 77c of mill 77. The lower end of seal 96 is pivotably mounted at pivot point 96a (e.g., a hinge) and moves between a raised position and a lowered portion. In the raised position of seal 96, which is shown in FIG. 3, seal 96 prevents the passage of the chaff stream 78 towards spreader 74 via passageway 87. In the lowered position of seal 96 (not shown), seal 96 covers the central opening 93a of pan 93 to (i) prevent the passage of the chaff stream 78 into the mills 77, and (ii) permit the passage of the chaff stream 78 into the passageway 87 towards spreader 74.

As best shown in FIG. 4, seal 96 is divided into two portions, namely, seal portion 96b and seal portion 96c that are positioned on opposing sides of cover 98. A rod (not shown) extends along pivot points 96a and connects both seal portions 96b and 96c together. In use, rotation of that rod causes both seal portions 96b and 96c to move together. Gaskets (not shown) may be positioned on the left and right sides of each seal portion 96b and 96c. The gaskets prevent the chaff material from escaping through spaces between the seal portions 96b/96c and the cover 98. And, the gaskets also prevent the chaff material from escaping through spaces between the seal portions 96b/96c and the sides 55 of the straw hood 54.

Another seal 59, which may be composed of rubber or metal, for example, is pivotably mounted to chopper housing wall 57a (or another fixed point on the combine). The connected end of seal 59 is pivotably mounted at pivot point 59a (e.g., a hinge) and moves between a raised position and a lowered portion. In the raised position of seal 59, which is shown in FIG. 3, seal 59 registers with seal 96 to prevent the passage of the chaff stream 78 towards spreader 74 via passageway 87. In the lowered position of seal 59 (not shown), seal 59 is positioned against chopper housing wall 57a to permit the passage of the chaff stream 78 towards spreader 74 via passageway 87 (assuming that seal 96 is also maintained in the lowered position). Seals 59 and 96 may also be referred to herein as doors or deflectors.

Figure 5:
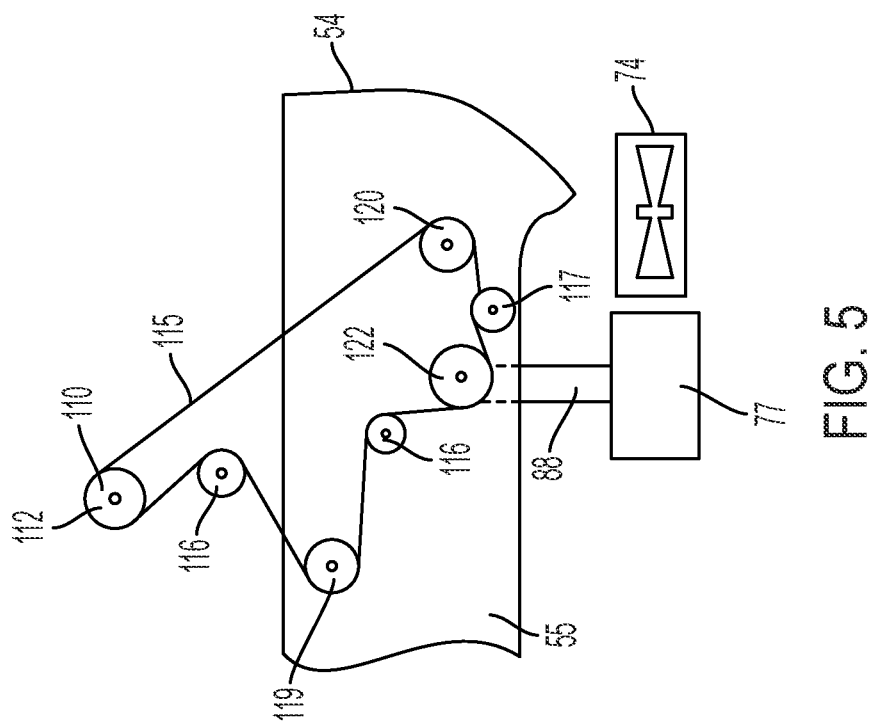
FIG. 5 is a side elevation view of the residue handling system of FIGS. 2-4 showing an arrangement of drive belts.

Turning now to FIG. 5, that figure shows a drive system that delivers power from the power take off (PTO) shaft of the combine to the chopper 72, mills 77 and other elements of the combine using a belt 115 on the exterior of the straw hood 54. Portions of the drive system are external of straw hood 54 whereas other portions of the drive system are internal to the straw hood 54. By way of background, conventional combines having weed seed mills and a chopper typically include three or more belts for powering those devices from a PTO shaft. The combine described herein only uses two belts (i.e., belts 115 and 88) for driving the chopper 72 and the mills 77, which is particularly advantageous from the perspective of efficiency, reliability, and cost. Belt 115 is external to straw hood 54, whereas belt 88 is internal to straw hood 54.

Referring still to the drive system shown in FIG. 5, a PTO shaft 110 on the combine is connected to receive power from the engine of the combine. A pulley 112 is positioned at the end of the shaft 110. The belt 115 is wound around the pulley 112. The belt is also wound about a pulley 119 that is connected to a shaft of beater 75. Idler pulleys 116 and 117 bear on belt 115 to impart tension to the belt 115 and remove any slack in the belt 115. The belt 115 is further wound about a chopper pulley 120 for rotating the pulley 120. A shaft extending from the pulley 120 is connected to the chopper 72 for rotating the chopper 72. The belt 115 is also wound around a jackshaft pulley 122 for rotating that pulley 122. A shaft 92 extends from pulley 122, and the shaft 92 is indirectly connected to the seed mills 77, as will be explained below. It is noted that the position of the above mentioned pulleys as well as the trajectory of belt 115 may vary from that which is shown and described. It is also noted that the belt 115 does not have to be would about pulley 119 and/or pulley 120 depending upon the configuration of the combine. It is further noted that the position of the idler pulleys 116 and 117 can vary, and the number of idler pulleys can vary.

FIGS. 3 and 4 depict the internal portion 100 of the drive system (i.e., at least partially internal to straw hood 54) that is configured for transferring power from the pulley 122 to the rotor of each seed mill 77. At the outset, it should be understood that the internal drive system 100 can be modified depending upon the location and style of seed mills 77. And, seed mills 77 are not limited to that which is shown and described herein.

Internal drive system 100 generally includes shafts 84a, 84b and 92, pulleys 86 and 90, gears 82 and belt 88. It is noted at the outset, however, that the internal drive system 100 is not limited to a belt drive including belt 88. For example, drive mechanism 100 may comprise a gearbox or a power take off shaft for transmitting power between shaft 92 and seed mills 77. And, if drive mechanism 100 includes such a gearbox or power take off shaft, then the portions of the gearbox or power take off shaft that are positioned within straw hood 54 would be concealed by cover 98.

Turning now to the individual components of internal drive system 100, one gear (referred to as an input member) of a bevel gear set 82 is connected to a rotor 73 of one of the seed mills 77. The other gear of the bevel gear set 82 is connected to one of the shafts 84a and 84b. Shafts 84a and 84b are releasably connected together by a releasable coupling 85. A pulley 86 is non-rotatably mounted to the shaft 84. A belt 88 is wound around the pulley 86 and a pulley 90. Belt 88 may be accessed (e.g., replaced, adjusted, etc.) by sliding coupling 85 along shaft 84a in a direction away from the belt 88. Alternatively, shaft 84a may be a collapsible shaft, as is known in the art, that can be disconnected from pulley 86. A bearing 89 supports pulley 86 and shaft 84b. Bearing 89 is especially useful for supporting shaft 84b when shaft 84a is disconnected from shaft 84b.

It is noted that bevel gear set 82 may be omitted if mills 77 are oriented vertically as opposed to the horizontal arrangement shown in FIG. 4.

Pulley 90 is non-rotatably connected to one end of a jackshaft 92 that extends through an opening formed in side wall 55 of the straw hood 54. Pulley 122 is non-rotatably connected to the opposite end of jackshaft 92 and is positioned outside of the straw hood 54. Belt 115 is wound around pulley 122, as was described above.

In operation, power from the engine (or other power source) is transferred to PTO shaft 110, which is transferred to pulley 122 via belt 115, which is transferred to pulley 90 via shaft 92, which is transferred to belt 88, which is transferred to pulley 86, which is transferred to both bevel gears 92 via shafts 84a and 84b, which is transferred to a rotor 73 positioned within each seed mill 77. Bevel gears 82 convert rotation along one axis to rotation along an orthogonal axis, as is known in the art. Power from PTO shaft 110 is also transferred to pulley 120 via belt 115, which is transferred to chopper 72. And, power from PTO shaft 110 is also transferred to pulley 119 via belt 115, which is transferred to beater 75. As noted above, pulley 120 or pulley 119 may be omitted depending upon the configuration of the combine.

Jackshaft 92, pulley 90 and at least a portion of belt 88 are positioned within passageway 69. Pulley 90 and belt 88 are enclosed by a cover 98 to either prevent or limit the amount of straw embedding on those elements. The leading and trailing ends 99 of cover 98 may be pointed edges to limit straw material from embedding on the surfaces of the cover 98. According to this example, cover 98 does not extend through upper wall 71. Rotatable shaft 92 is enclosed in a protective hollow tube 95 to prevent straw from contacting shaft 92. Cover 98, pulley 90, jackshaft 92 and tube 95 are positioned downstream of discharge beater 75 and upstream of chopper 72 in the direction of crop flow.

Cover 98 bifurcates chaff passageway 83 into two separate and narrowed passageways, as shown in FIG. 4. Each passageway 83 leads to an inlet of seed mill 77. Rotor 73 is positioned within the hollow interior of mill 77, and is surrounded by a concave or stator, as is known in the art and described in the '232 patent. Destroyed seeds are outputted from seed mill 77 via an outlet port 91.

By positioning the drive mechanism 100 at least partially in passageway 69, it is not necessary to position any mechanisms for powering the seed mills 77 within the rear wheel wells of the combine 10 at a location that would interfere with the turning radius of the rear wheels. It is noted that pulley 122 is positioned well above the rear wheels.

Although not shown, cover 98, pulley 90, and belt 88 do not have to be positioned in the center of the straw hood 54, as viewed in FIG. 4. Those components may be positioned to one side of the straw hood 54, such as against the sidewall 55. If such a modification were made, the rotors 73 could be connected in series (as opposed to the parallel connection shown in FIG. 4).

It should be understood that the particular details of the seed mills 77 and chopper 72 may vary from that which is shown and described.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester comprising:
   a straw hood having a hollow interior space for receiving material other than grain (MOG) from a threshing and separating system of the harvester and chaff from a cleaning system of the harvester; and
   a drive system for powering a straw chopper and a weed seed mill, wherein the drive system comprises a single belt that is positioned outside of the straw hood and is wound at least partially around (i) a straw chopper pulley that powers the straw chopper, (ii) a weed seed mill pulley that powers the weed seed mill, and (iii) a power take off shaft of the harvester that receives power from an engine or other power source of the harvester.

2. The agricultural harvester of claim 1 further comprising the straw chopper that is positioned within the straw hood.

3. The agricultural harvester of claim 2, wherein the straw chopper is positioned above a spreader of the harvester for directing chopped straw to the spreader.

4. The agricultural harvester of claim 2, wherein the straw chopper is a beater that is configured to be operated at two different speeds, wherein one of the speeds of the beater is capable of chopping straw.

5. The agricultural harvester of claim 1 further comprising the weed seed mill and a jackshaft that is connected for transferring motion between the weed seed mill pulley and the weed seed mill, wherein the jackshaft extends into the hollow interior space of the straw hood.

6. The agricultural harvester of claim 5, wherein the jackshaft is connected to an internal drive system that drives the weed seed mill, wherein the internal drive system comprises a second belt, a gear box or a power take off shaft.

7. The agricultural harvester of claim 6, wherein the internal drive system comprises the second belt, and the second belt is positioned within the hollow interior space and is concealed and surrounded by a cover to either limit or prevent MOG and chaff from embedding on surfaces of the second belt.

8. The agricultural harvester of claim 1, wherein the drive system comprises two pulleys that are interconnected by a second belt, and wherein a first pulley of the two pulleys and the second belt are at least partially positioned within the hollow interior space, and wherein the first pulley is configured to be indirectly connected to an engine or other power source of the harvester and a second pulley of the two pulleys is configured to be either directly or indirectly connected to a rotor of the seed mill.

9. The agricultural harvester of claim 1, wherein no more than two belts are provided for transferring power from the power take off shaft to the weed seed mill.

10. The agricultural harvester of claim 1 further comprising idler pulleys that bear on the belt for imparting tension to the belt.

11. The agricultural harvester of claim 1, wherein the belt is at least partially positioned within a wheel well of the harvester.

12. The agricultural harvester of claim 1, wherein the single belt comprises no more than one belt positioned outside of the straw hood.

13. The agricultural harvester of claim 1, wherein the straw hood comprises a top wall and side walls, wherein the top and side walls together define the hollow interior space, and wherein the straw chopper pulley and the weed seed mill pulley are mounted to one of the side walls.

14. The agricultural harvester of claim 1, wherein the weed seed mill comprises a rotor and stator, and the rotor is configured to rotate with respect to the stator for damaging weed seeds passing between the rotor and stator.

15. The agricultural harvester of claim 1 further comprising two weed seed mills that are each connected to receive power from the weed seed mill pulley.

* * * * *